(12) United States Patent
Heed et al.

(10) Patent No.: US 6,903,708 B1
(45) Date of Patent: Jun. 7, 2005

(54) VIEWING INSTRUMENT

(76) Inventors: Björn Heed, Utlandagatan 19, SE-412/61, Göteborg (SE); Stefan Witte, Fortgatan 3 A, SE-421 76, Västra Frölunda (SE)

( * ) Notice: Subject to any disclaimer, the term of this patent is extended or adjusted under 35 U.S.C. 154(b) by 0 days.

(21) Appl. No.: 09/319,222
(22) PCT Filed: Nov. 5, 1997
(86) PCT No.: PCT/SE97/01846
§ 371 (c)(1), (2), (4) Date: Aug. 23, 1999
(87) PCT Pub. No.: WO98/26321
PCT Pub. Date: Jun. 18, 1998

(30) Foreign Application Priority Data

Dec. 9, 1996 (SE) .............................. 9604522

(51) Int. Cl.⁷ ................................................ G09G 5/00
(52) U.S. Cl. ...................................... 345/8; 348/333.01
(58) Field of Search ................................. 345/7, 8, 559, 345/208, 231, 65, 220, 241; 348/333.01, 333.02, 333.09

(56) References Cited

U.S. PATENT DOCUMENTS

| 4,310,849 A | 1/1982 | Glass |
| 4,395,731 A | 7/1983 | Schoolman |
| 4,504,129 A | 3/1985 | Van Iderstine |
| 4,516,157 A | 5/1985 | Campbell |
| 4,523,821 A | 6/1985 | Lang et al. |
| 4,631,580 A | 12/1986 | Taube et al. |
| 5,270,810 A * | 12/1993 | Nishimura ............... 358/98 |
| 5,317,399 A * | 5/1994 | Satake et al. ............ 348/571 |
| 5,589,943 A * | 12/1996 | Kozuki et al. ........... 386/121 |
| 5,712,680 A * | 1/1998 | Hieda ...................... 348/220 |
| 5,740,801 A * | 4/1998 | Branson .................. 128/920 |
| 6,088,053 A * | 7/2000 | Hammack et al. ......... 348/61 |

FOREIGN PATENT DOCUMENTS

WO   WO95/25979   9/1995

* cited by examiner

*Primary Examiner*—Dennis-Doon Chow
(74) *Attorney, Agent, or Firm*—Burns, Doane, Swecker & Mathis, LLP

(57) ABSTRACT

The invention relates to a viewing instrument wherein the image being viewed by the user may be frozen owing to the provision of a memory function. In connection with the freezing of the image, the latter may be magnified in such a manner that a highly magnified image may be viewed without such discomfort as is due to shaking movements of the image while the user may perform a wide-angle-of-vision search for an image to be magnified.

15 Claims, 1 Drawing Sheet

VIEWING INSTRUMENT

BACKGROUND OF THE INVENTION

1. Field of the Invention

The present invention relates to distance viewing instruments, and more particularly, to a distance viewing instrument that has an imaging freezing function.

2. Description of the Related Art

In using conventional hand-held viewing instruments the largest useful magnification is restricted by the difficulty experienced by the user of holding such handheld instruments sufficiently stable. The slightest shaking movement of the instrument causes the image viewed by the user to shake also. In the case of high degrees of magnification the shaking movements affect the image to such an extent that as to make perception thereof difficult. Hand-held viewing instruments therefore are rarely used for magnification above ten. Magnification to seven or eight is common for practical purposes.

When viewing instruments are used to view objects that appear small against a large background, such as birds or aeroplanes against the sky, high-magnification instruments may make it difficult to find the objects one wishes to study. High magnification reduces the field of vision.

BRIEF SUMMARY OF THE INVENTION

In a viewing instrument in accordance with the present invention these disadvantages related to the shaking motions and to the difficulties in finding the target objects may be overcome. This is achieved by the possibility of freezing the instrument-produced image. The frozen image may then be studied without inconvenience, also if the instrument itself is subjected to shaking movements. This technique provides the viewer with the possibility of studying the frozen image in detail under larger magnification. To find the object to be viewed, the viewer uses a low degree of magnification, which provides him with a large field of vision. Once he has found the object he seeks and preferably has centred it to the centre field of the image, he freezes the image and may study the image without the latter being subjected to shaking movements. At this stage it is also possible to magnify the frozen image. If in this case the image is centred on the object the viewer wishes to view in closer detail, enlargement of the central part of the image suffices for that purpose.

BRIEF DESCRIPTION OF THE SEVERAL VIEWS OF THE DRAWINGS

The present invention will now be described by way of exemplary embodiments with reference to the accompanying figures in which.

DETAILED DESCRIPTION OF THE INVENTION

Figure 1:
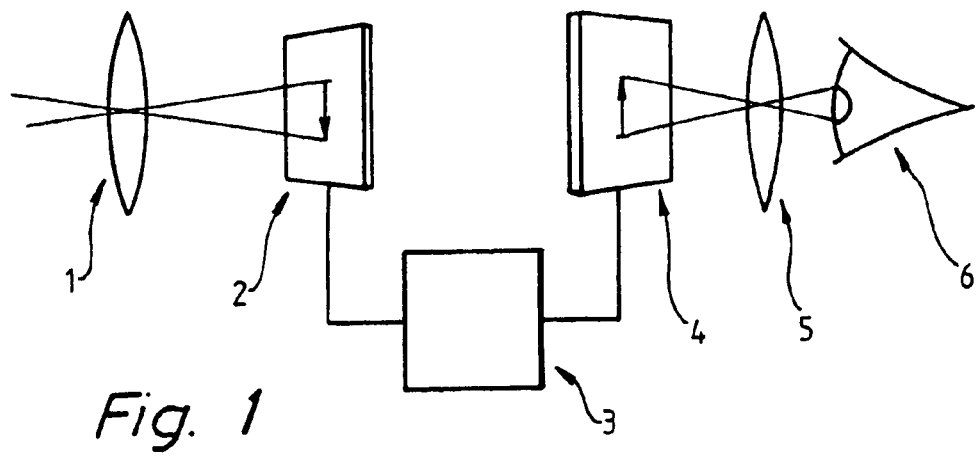
FIG. 1 illustrates a first embodiment of the present invention.

One embodiment of the invention is illustrated in FIG. 1, wherein numeral reference 1 designates a focus lens or objective producing an image on the electronic retina 2. From the retina data signals representative of the image are forwarded to the processing and memorising unit 3, the latter being connected to a screen 4 displaying an image that may be received by the viewer's eye 6 via the ocular 5. While the viewer is looking for some object to be studied in closer detail, the screen constantly and in real time displays the image registered by the electronic retina at any moment. When a button (not shown in the drawing figure) is depressed, the image displayed on the screen 4 freezes into a standstill, and thus the displayed image no longer coincides with that registered by the electronic retina. This allows the viewer to study the non-shaking image in peace and quiet until such time as he releases the button and in response thereto the image displayed on the screen 4 again in real time shows the image being registered by the electronic retina 2. The freezing feature may be achieved e.g. with the aid of a memory function incorporated in the processing unit 3. However, an equivalent memory function installed in the screen 4 or the electronic retina 5 could be used to provide this function. As an alternative to image freezing by means of a depression-activated button, freezing may be effected with the aid of a timer set to automatically provide alternating moving and frozen images at suitable intervals.

The magnification that the viewer experiences when using this kind of viewing instrument is a result among other things of the focal lengths of the optical systems 1 and 5 and of the dimensions of the electronic retina 2 and the display screen 4. In a simple variety of the invention, the magnification degree rests constant. In accordance with a more sophisticated form the invention, the magnification changes as the image freezes, and this is due to such a change of the transfer of the image from the electronic retina 2 to the display screen 4 effected by the processing unit 3 that only a smaller section of the area of the electronic retina 2 is pictured, spread across the entire surface of the display screen 4. This additional magnification when viewing a frozen image could either be set at a fixed value or be selected by setting the process unit 3.

Electronic retinas and display screens typically operate by division of the areas into a large number of smaller elements or pixels. In order for the magnified image as described above to be completely useful and show a larger number of details than the non-magnified image, the number of such pixels in the magnified area of the electronic retina must be equal to the number of pixels of the entire display screen. To use different pixel densities in different parts of the electronic retina may be complicated and expensive. Also, to use an electronic retina exhibiting high pixel density over its entire area may also be an expensive solution.

Figure 2:
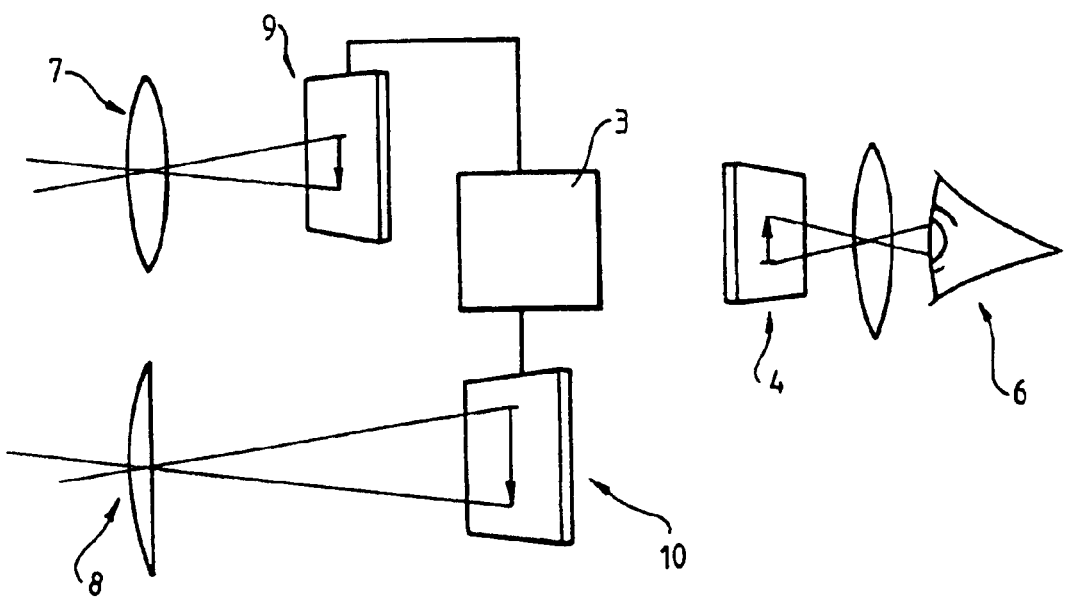
FIG. 2 illustrates a second embodiment of the present invention.

FIG. 2 illustrates an embodiment of the invention wherein these problems have been solved by the use of two different focus lenses 7 and 8, each having its respective electronic retina 9 and 10. In this case, the focus lens 7 is adapted to the electronic retina 9 in such a manner as to give the system a moderate degree of magnification but a considerable angle of vision. The focus lens 8, on the other hand, is so adapted to the electronic retina 10 that the degree of magnification of the system becomes high but at the expense of a reduced field of vision. When electronic retinas of equal dimensions are used, a focus lens having a longer focal length results in a higher degree of magnification.

In this case the processing unit 3, when searching for an object, supplies a constantly up-dated real-time image on the display screen 4, which image is received from the optical system formed by the focus lens 7 and the electronic retina 9. In response to depression of a button, the processing unit 3 shifts to displaying a frozen image received from the optical system formed by the focus lens 8 and the electronic retina 10. This latter image thus is an enlarged and still section of what has been shown previously.

The two electronic retinas 9 and 10 need not be physically separated. They may be individual parts of a larger electronic retina. It is likewise possible to use one electronic retina only, which is adapted to move by mechanical means between two positions and be exposed to receive images from one of the two lenses having different focal lengths. An identical effect may be achieved by means of a stationarily positioned electronic retina exposed to receiving images optically linked to said retina via moving mirrors or prisms. Alternatively, the focus lenses may exchange positions, and so on. The single electronic retina could also be exposed to receive two different images one of which is alternatingly screened off by a movable screen. The object in question could also be viewed optically in the form of a wideangle image one portion of which, preferably a central portion, is treated as outlined above.

The same effect may be achieved by using one single electronic retina, which registers the image received from a focus lens having a variable focal length.

The instrument described above is in principle a monoocular viewing instrument used for one eye only. Two such instruments, when interconnected, results in a binocular type of viewing instrument used for both eyes. An instrument of this type is more comfortable and less eye-fatiguing. In order to obtain a less expensive instrument structure while retaining the above advantage, the instrument may be designed in such a manner that only a front part is used, having one or two focus lenses and one or two electronic retinas as defined above, which are connected to a processing unit supplying identical images to two different display screens, one for each eye. Alternatively, a larger display screen, which may be viewed by both eyes, could be used.

What is claimed is:

1. A hand-held telescopic real-time observation instrument for distant objects, comprising at least one line-of-sight viewing system, each line-of-sight viewing system being provided with a set of optical lenses, having a first-zoom state, and having electronic retina means registering a presented real-time observation, and an electronic display screen showing an image of said presented real-time observation, wherein said display screen has two display modes: a real-time display mode, and a still-image display mode, said display screen being adapted to exclusively show only one display mode at a time at the choice of a user of said instrument by control means, wherein said display screen in said still-image display mode freezes said presented real-time observation and said instrument assumes a second zoom-state in order to further magnify said frozen image, wherein an eye of a user need not change viewing position when changing between said two display-modes, wherein said optical system includes a set of optical lenses for providing enlargement in said first mode and said electronic retina means provides a higher degree of magnification and a lower field of vision as compared to the first mode, when in said second mode.

2. A hand-held telescopic real-time observation instrument as claimed in claim 1, further comprising a timer for time-interval freezing of the image.

3. A hand-held telescopic real-time observation instrument as claimed in claim 2, further comprising an electronic processing unit which connects one or several electronic retinas with an electronic display screen.

4. A hand-held telescopic real-time observation instrument as claimed in claim 1, further comprising an electronic processing unit which connects one or several electronic retinas with an electronic display screen.

5. A hand-held telescopic real-time observation instrument as claimed in claim 1, further comprising only one electronic retina, and wherein said electronic retina is arranged to be optically or mechanically exposed to receive different-size images in such a manner that the frozen image being viewed has a larger size on the display screen than the non-frozen image, the latter image is contrast comprising a larger angle of vision.

6. A binocular comprising two interconnected hand-held telescopic real-time observation instruments as claimed in claim 1.

7. A hand-held telescopic real-time observation instrument for both eyes as claimed in claim 1, further comprising two display screens, one for each eye and showing the same image at different angles.

8. A hand-held telescopic real-time observation instrument as claimed in claim 1, further comprising a depressible button for image freezing.

9. A hand-held telescopic real-time observation instrument as claimed in claim 1, further comprising a control means for image freezing.

10. A hand-held telescopic real-time observation instrument as claimed in claim 1, further comprising a depressible button for image freezing.

11. A hand-held telescopic real-time observation instrument as claimed in claim 1, further comprising an electronic processing unit which connects one or several electronic retinas with an electronic display screen.

12. A hand-held telescopic real-time observation instrument as claimed in claim 1, further comprising only one electronic retina, wherein electronic retina is arranged to be optically or mechanically exposed to receive different-size images in such a manner that the frozen image being viewed has a larger size on the display screen than the non-frozen image, the latter image in contrast comprising a larger angle of vision.

13. A binocular comprising two interconnected telescopic real-time observation instruments as claimed in claim 1.

14. A hand-held telescopic real-time observation instrument for both eyes as claimed in claim 1, further comprising two display screens, one for each eye and showing the same image.

15. A hand-held telescopic real-time observation instrument as claimed in claim 1, further comprising two display screens, one for each eye and showing the same image.

* * * * *